United States Patent Office 3,243,254
Patented Mar. 29, 1966

3,243,254
METHOD FOR EXTRACTING LANTHANIDES AND ACTINIDES
Thomas H. Siddall III, Aiken, S.C., assignor to the United States of America as represented by the United States Atomic Energy Commission
No Drawing. Filed Aug. 20, 1963, Ser. No. 303,456
10 Claims. (Cl. 23—14.5)

The invention described herein was made in the course of, or under, a contract with the U.S. Atomic Energy Commission.

The present invention relates to a method for removing trivalent lanthanide and trivalent actinide values from aqueous solutions by liquid-liquid extraction and more particularly to a method for removing cerium, promethium, and americium nitrates from aqueous nitric acid waste solutions.

The highly acidic waste concentrates from the reprocessing of nuclear fuels are important sources of trivalent lanthanides and actinides. However, it is necessary to process large volumes of aqueous wastes to recover small amounts of these materials. Organophosphorus esters, such as tri-n-butyl phosphate, have been highly successful in extracting uranium values from an aqueous solution containing uranium, plutonium, and fission products, but have proven rather poor extractants of trivalent lanthanides and actinides from aqueous nitric acid solutions, requiring when used numerous stages of solvent extraction to extract these elements. Thus, it is desirable to find a process to reduce these volumes by a large factor in the first process step by as simple means as possible.

Heretofore, liquid-liquid extraction processes for removal of trivalent lanthanides and actinides from aqueous solutions required either very high concentrations of salting agents in the aqueous phase when organophosphorus esters were used or were operable only at very low acid concentrations with very delicate pH control required when organophosphorus acids were used. Further, when phosphine oxides were used they required low concentrations of nitric acid. The limitation of these previously used extractants imposed restrictions requiring careful make-up of process feed, extra expense of the addition of metal salts to increase the salting strength or basic solutions to lower the acidity, delicate process control and an additional burden in disposing of the barren liquors after extraction because of the added salts or neutralizing agents.

Accordingly, a general object of this invention is to provide a method for recovering trivalent lanthanide and trivalent actinide values from aqueous solutions.

Another object is to provide such a method wherein the trivalent lanthanide and actinide values are recovered and concentrated from a wide range of aqueous solutions without the necessity of close process control.

A further object is to provide a method for recovering almost completely all of the trivalent lanthanide and actinide values from an aqueous solution in a single solvent extraction step.

A still further object is to provide a method for recovering trivalent cerium, promethium, and americium nitrates from acidic aqueous solutions, aqueous solutions of metal salts, or aqueous solutions of a mixture of acid and metal salts.

In accordance with the present invention an improved method for removing trivalent lanthanide and trivalent actinide values from acidic aqueous solutions comprises contacting said solution with certain bidentate organophosphorus extractants alone or dissolved in an inert organic diluent. By bidentate it is meant that these compounds contain two functional (or complexing) groups within the same molecule. The organophosphorus extractants of the present invention are members selected from a group of compounds having the general formulae:

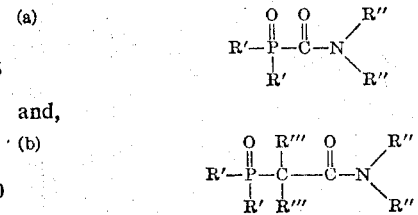

(a) and (b) formulas shown

Where $R'$ is selected from a group consisting of alkyl, aryl, aralkyl, alkoxy, aryloxy and aralkoxy radicals, where $R''$ is selected from a group consisting of alkyl, aryl, aralkyl radicals and the hydrogen atom provided that not more than one $R''$ is an hydrogen atom, where $R'''$ is selected from a group consisting of alkyl, aryl, aralkyl radicals and the hydrogen atom and where neither the $R'$ are necessarily both the same nor the $R''$ necessarily both the same, nor the $R'''$ necessarily both the same.

Treatment of nitric acid solutions containing cerium, promethium and americium values with these bidentate extractants resulted in better than 99% of these values being extracted into the organic phase, thereby affording a simple method requiring only a single solvent extraction stage for removing said values from waste solutions containing same.

Further, extraction coefficients of nitric acid solutions containing cerium, promethium and americium values were approximately 100 times as large over most of the acidity range as those obtained with the monodentate, i.e., only one functional group, extractants, such as tri-n-butyl phosphate.

While it is greatly preferred to use the instant extractants neat and undiluted, it may be desirable to use them dissolved in an inert organic diluent, such as n-dodecane or decahydronaphthalene. Care should be taken in selecting a diluent which will afford a wide range of extractant constitution and solution composition without the formation of a second organic phase. Thus, when dilution is desired, decahydronaphthalene is preferred as the diluent. However, on dilution, as might be expected, these organic extractants lose some of their extraction power. For example, extraction of cerium (III) is about second-power dependent on concentration of di-n-hexyl N,N-dibutyl carbamylmethylenephosphonate and slightly greater than third-power dependent on concentration of di-n-octyl N,N-diethyl carbamylphosphonate. It is understood that most of the prior art organic diluents may be used with the instant extractants.

These bidentate organophosphorus compounds are not presently commercially available but are easily synthesized from readily available starting materials in from fair to excellent yields. For example, di-n-hexyl N,N-diethyl carbamylphosphonate

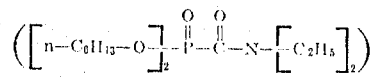

as a representative of class (a) can be synthesized in excellent yield by either of two routes—

(a) *The Arbuzov-Michaelis rearrangement.*—An equimolar quantity of diethyl carbamyl chloride

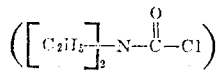

is added rapidly to tri-n-hexyl phosphite ($[C_6H_{13}-O]_3P$) that has been heated to between 200 and 215° C. The addition takes place in a heated reaction vessel that is equipped with a short fractionating column and still head to allow the escape of the hexyl chloride that is produced as a by-product, but to retain the carbamyl chloride. After the addition is completed, the reaction mixture is held at this temperature for not more than five minutes then partially cooled an charged to a high-vacuum still for separating product by-product and unconsumed reactants.

(b) *The Michaelis reaction.*—Sodium metal is dissolved in a di-n-hexyl phosphite and a hydrocarbon diluent at about 100° C., all in a suitable vessel. Equimolar diethyl carbamyl chloride is added and the temperature maintained for four hours. The reaction mixture is then cooled and washed with water to remove by-product sodium chloride. After washing, the product is distilled under high vacuum. Similarly, di-n-hexyl N,N-diethyl carbamylmethylenephosphonate

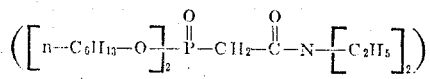

as a representative of class (b) can be synthesized by the same reaction by adding rapidly an equimolar quantity of diethyl chloracetamide,

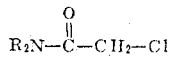

to an equimolar quantity of trialkyl phosphite that has been heated to between 200 and 215° C. and maintaining the temperature for not more than five minutes with similar product recovery steps as mentioned before.

The temperature and acidity of the aqueous solution may vary widely. However, the preferred temperature is about 30° C. with any acid concentration being preferred in which the formation of a second organic phase is avoided. Acid concentrations as high as 12 M $HNO_3$ have given a single organic phase at 25° C. with 0.5 M solutions of the instant extractants. The acidity of the aqueous solution is obtained by strong inorganic acids, such as nitric and hydrochloric acids.

The ratio of the volume of aqueous phase to volume of organic phase may be varied over a wide range. Among the factors affecting the choice of phase ratio are (1) the desired loading of lanthanide and/or actinide values in the organic phase, (2) the composition of the aqueous phase and (3) the particular extractant. In most situations it will be desirable to have a relatively small volume of organic phase since one of the chief functions of these extractants is to concentrate values that are dilute in the aqueous phase. Suitable phase ratios may be from as little as 0.001 volume of organic phase per volume of aqueous phase up to any desired volume of organic phase per volume of aqueous phase.

The instant invention is particularly well suited for recovering trivalent lanthanide and actinide values from the concentrated waste solutions from such processes as the Purex process. For a complete description of the Purex process see U.S. Patent No. 2,990,240, issued June 27, 1961, in the names of Charles N. Ellison and Thomas C. Runion, for "Process for Segregating Uranium from Plutonium and Fission Product Contamination." This is especially true for the recovery of promethium, americium, and cerium nitrates from such waste solutions.

Further illustration of the quantitative aspects and procedures of the present invention is provided in the following examples.

EXAMPLE I

Eleven samples of one milliliter solutions of varying nitric acid concentrations containing 100,000 disintegrations per minute each of americium[241] and cerium[144] and 500,000 disintegrations per minute of promethium[147] were mixed for about one minute with one milliliter of undiluted dibutyl N,N-diethyl carbamylphosphonate which had been washed immediately before use with 5 milliliters of 12 molar nitric acid. Similarly, ten samples of one milliliter solutions of varying nitric acid concentrations containing 100,000 disintegrations per minute of cerium were mixed for about one minute with one milliliter of undiluted dibutyl butylphosphonate. The phases were allowed to settle and separate. Counting samples of 25 microliters of the organic phase were placed in stainless steel pans and the cerium[144] and promethium[147] were determined by differential beta counting through absorbers and the americium[241] by alpha counting. Then, the cerium, promethium and americium values were stripped from the organic phase by washing with 5 ml. of 0.01 M nitric acid. The extraction coefficient, which is defined as the mass of metal species in a unit volume of organic phase divided by the mass of the same metal species in a unit volume of the aqueous phase, for the dibutyl N,N-diethylcarbamylphosphonate for the various samples were determined by dividing the counts of each actinide or lanthanide in the organic phase by the counts of each one in the aqueous phase. Similarly, extraction coefficients for dibutyl butylphosphonate were obtained. Example II shows the extraction coefficients of dibutyl N,N-diethyl carbamylmethylenephosphonate.

EXAMPLE II

Ten samples of one milliliter solutions containing the same constituients as those in Example I were mixed for about one minute with one milliliter of undiluted dibutyl N,N-diethyl carbamylmethylenephosphonate which had been washed immediately before use with 5 milliliters of 12 molar nitric acid. The same procedures as detailed in Example I were used for determining the extractant coefficient for the dibutyl N,N-diethyl carbamylmethylenephosphonate for the various samples. The results are shown in Table I and Table II below.

*Table I.—Extraction of cerium, promethium, and americium nitrates at 30° C., undiluted extractants*

| Extractants | Nitric acid aqueous phase, M | Extraction coefficients | | |
|---|---|---|---|---|
| | | Ce | Pm | Am |
| Dibutyl N,N-diethyl carbamylphosphonate. | 12.0 | 440 | 900 | 1,000 |
| | 10.3 | 260 | | |
| | 8.7 | 48 | 51 | 68 |
| | 7.2 | 17.6 | 16 | 19 |
| | 6.0 | 8.2 | | |
| | 4.48 | 1.85 | 1.2 | 1.7 |
| | 3.14 | 0.72 | 0.47 | 0.53 |
| | 1.98 | 0.26 | 0.15 | 0.18 |
| | 1.47 | 0.180 | 0.136 | 0.125 |
| | 0.78 | 0.059 | | |
| | 0.70 | 0.058 | 0.077 | 0.069 |
| Dibutyl N,N-diethyl carbamylmethylene-phosphonate. | 11.6 | 24.7 | 53 | 48 |
| | 10.5 | 44 | 78 | 76 |
| | 9.0 | 78 | 105 | 118 |
| | 7.3 | 118 | 119 | 161 |
| | 4.74 | 118 | 83 | 99 |
| | 2.60 | 43 | 27 | 32 |
| | 1.28 | 13.8 | 9.5 | 10 |
| | 0.65 | 5.6 | 3.8 | 4.6 |
| | 0.38 | 3.4 | 2.4 | 2.8 |
| | 0.20 | 1.7 | | |

Table II.—Extraction of Cerium nitrate at 30° C., undiluted extractants

| Extractants | Nitric acid aqueous phase, M | Extraction coefficient Ce |
|---|---|---|
| Dibutyl butylphosphonate | 5.5 | 0.35 |
| | 3.67 | 0.78 |
| | 2.73 | 1.08 |
| | 1.96 | 1.12 |
| | 1.00 | 1.21 |
| | 0.55 | 0.73 |
| | 0.271 | 0.36 |
| | 0.196 | 0.211 |
| | 0.100 | 0.060 |

The results in Table I and II show the greater extraction power of the bidentate extractants as compared to that for a typical monodentate extractant that has previously been used. The extraction coefficients for these bidentate extractants were approximately 100 times as large over most of the acidity range as those obtained with the monodentate.

Also, the results show the excellent suitability of these bidentates for use in processes wherein almost complete recovery of the trivalent lanthanide and actinide values is desired in a single stage of solvent extraction. The extration coefficient for these bidentates were found to be so large that in most cases almost 99% of the trivalent lanthanide and actinide values could be extracted in a single stage of solvent extraction. Further, at low nitric acid concentrations the extraction coefficients with the bidentate extractants became small which readily affords stripping of the trivalent lanthanides and actinides into water or dilute nitric acid.

EXAMPLE III

Three samples of one milliliter solutions of 12 molar hydrochloric acid containing 100,000 disintegrations per minute of cerium were prepared. The first sample was mixed with one milliliter of undiluted tributyl phosphate for about one minute with the other two samples being mixed with dibutyl N,N-diethyl carbamylphosphonate and dihexyl, N,N-diethylcarbamylmethylenephosphonate, respectfully. The same procedures as detailed in Example I were used for determining the extraction coefficients for the various extractants. The results are shown in Table III.

Table III.—Extraction of cerium (III) from 12 molar hydrochloric acid solutions by various extractants at 30° C., undiluted Extractants: Extraction Coefficient, Ce (III)
Tributylphosphate _____ 0.58
Dibutyl N,N-diethyl carbamylphosphonate __ 24
Dibutyl N,N-diethyl carbamylmethylenephosphonate _____ 4.7

Table III shows that these bidentate extractants are equally effective in aqueous media other than nitric acid solutions, such as hydrochloric acid solutions.

Example IV shows the effect of solutions containing a mixture of salting agents on the distribution coefficient of the bidentate extractants for the trivalent lanthanide and actinide values, which is illustrated by Cerium III.

EXAMPLE IV

Nine samples of various metal salts and acid concentrations each of which contained 100,000 disintegrations per minute of cerium were prepared; three contained 0.7 M Al(NO$_3$)$_3$ in 6 M HNO$_3$, three contained 1 M Al(NO$_3$)$_3$ in 4 M HNO$_3$, and three contained 1 M Al(NO$_3$)$_3$ and 3.0 M NaNO$_3$ in 0.5 M HNO$_3$. One milliliter samples of each of the three sets of solutions were mixed for approximately one minute with one milliliter of undiluted tributylphosphate. Similarly, one milliliter samples of each of the three sets of solutions were mixed with one milliliter of undiluted dihexyl N,N-diethyl carbamylphosphonate and dihexyl N,N-diethyl carbamylmethylenephosphonate. The same procedures as detailed in Example I were followed except that the cerium in the organic phase was determined by taking 5 microliters of the organic phase diluting it to one milliliter and counting for gamma activity. The results are shown in Table IV below.

Table IV.—Extraction coefficient for Cerium III, 30° C.

| Aqueous composition | Extractants | | |
|---|---|---|---|
| | Tributyl phosphate | Dihexyl N,N-diethyl carbamylmethylenephosphonate | Dihexyl N,N-diethyl carbamylphosphonate |
| 0.7 M Al(NO$_3$)$_3$, 6 M HNO$_3$ | 0.2 | 74 | 23 |
| 1.0 M Al(NO$_3$)$_3$, 4 M HNO$_3$ | 0.17 | 210 | 11 |
| 1 M Al(NO$_3$)$_3$, 0.5 M HNO$_3$, 3.0 M NaNO$_3$ | 1.1 | 410 | 3.6 |

Table IV shows that the bidentates extractants are superior to monodentate extractants, such as tributylphosphate, for extracting trivalent lanthanide and actinide values from aqueous solutions that contain a mixture of salting agents. The extraction coefficient of dihexyl N,N-diethylcarbamylphosphonate for cerium was found to diminish as the acid concentration was lowered. However, the extraction coefficient of the dihexyl N,N-diethylcarbamylmethylenephosphonate for cerium was found to maintain a position of striking superiority over the tributylphosphonate even at low acid concentrations.

It is to be understood that the foregoing examples are merely illustrative and are not intended to limit the scope of this invention, but the invention should be limited only by the scope of the appended claims.

What is claimed is:

1. A process for the recovery of trivalent lanthanide and actinide values from an aqueous solution which comprises:
   (a) contacting said aqueous solution with a bidentate organic extractant selected from the group consisting of compounds having the general formulae:

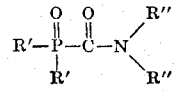

and,

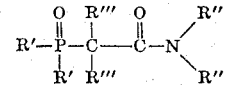

wherein R' is selected from the group consisting of alkyl, aryl, aralkyl, alkoxy, aryloxy, and aralkoxy radicals, where R" is selected from the group consisting of alkyl, aryl, aralkyl radicals and the hydrogen atom provided that not more than one R" is a hydrogen atom, where R''' is selected from the group consisting of alkyl, aryl, aralkyl, radicals and the hydrogen atom and where neither the R' are necessarily both the same, nor the R" necessarily both the same, nor the R''' necessarily both the same, thereby extracting said trivalent lanthanide and actinide values into the organic phase,
   (b) separating the resulting lanthanide and actinide loaded organic phase from the remaining aqueous solution, and
   (c) subsequently stripping the lanthanide and actinide values into an aqueous phase.

2. The process of claim 1 wherein said aqueous solution is an acidic solution containing dissolved metal salts and a strong inorganic acid selected from the group consisting of nitric and hydrochloric acid.

3. The process of claim 1 wherein said bidentate organic extractant is dihexyl N,N-diethyl carbamylphosphonate.

4. The process of claim 1 wherein said bidentate organic extractant is dihexyl N,N-diethyl carbamylmethylenephosphonate.

5. The process of claim 1 wherein said trivalent lanthanide and actinide values are cerium$^{144}$, promethium$^{147}$ and americium$^{241}$, said aqueous solution is a nitric acid solution containing said values along with their nitrate salts, and said bidentate organic extractant is dihexyl N,N-diethyl carbamylmethylenephosphonate.

6. A process for the recovery of trivalent lanthanide and actinide values from an aqueous solution which comprises:
(a) contacting said aqueous solution with a bidentate organic extractant dissolved in a suitable organic diluent where the organic extractant is selected from the group consisting of compounds having the general formulae:

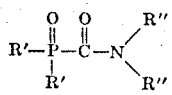

and,

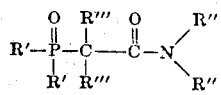

wherein R' is selected from the group consisting of alkyl, aryl, aralkyl, alkoxy, aryloxy, and aralkoxy radicals, where R'' is selected from the group consisting of alkyl, aryl, aralkyl radicals and the hydrogen atom provided that not more than one R'' is a hydrogen atom, where R''' is selected from the group consisting of alkyl, aryl, aralkyl radicals and the hydrogen atom and where neither the R' are necessarily both the same nor the R'' necessarily both the same, nor the R''' necessarily both the same, thereby extracting said trivalent lanthanide and actinide values into the organic phase,
(b) separating the resulting lanthanide and actinide loaded organic phase from the remaining aqueous solution, and
(c) subsequently stripping the lanthanide and actinide values into an aqueous phase.

7. The process of claim 6 wherein said aqueous solution is an acidic solution containing dissolved metal salts and a strong inorganic acid selected from the group consisting of nitric and hydrochloric acid.

8. The process of claim 6 wherein said bidentate organic extractant is dihexyl N,N-diethyl carbamylphosphonate and said organic diluent is decahydronaphthalene.

9. The process of claim 6 wherein said bidentate organic extractant is dihexyl N,N-diethyl carbamylmethylenephosphonate and said organic diluent is decahydronaphthalene.

10. The process of claim 6 wherein said trivalent lanthanide and actinide values are cerium$^{144}$, promethium$^{147}$ and americium$^{241}$, said aqueous solution is a nitric acid solution containing said lanthanide and actinide values along with their nitrate salts, and said bidentate organic extractant is dihexyl N,N-diethyl carbamylmethylenephosphonate dissolved in decahydronaphthalene.

References Cited by the Examiner

UNITED STATES PATENTS 2,943,923  2/1958  Morgan _____ 23—14.5

LEON D. ROSDOL, *Primary Examiner.*

SEYMOUR TRAUB, *Assistant Examiner.*